United States Patent Office 2,986,582
Patented May 30, 1961

2,986,582

BIS(MERCAPTOALKYL)TETRAALKYL BENZENE PREPARATION

Robert W. Martin, Lafayette, and Fred E. Condo, El Cerrito, Calif., assignors to Shell Oil Company, a corporation of Delaware No Drawing. Filed Nov. 21, 1955, Ser. No. 548,244

2 Claims. (Cl. 260—609)

This invention relates to a new class of sulfur-containing products. More particularly, the invention relates to novel products containing one or more polyhydrocarbyl-substituted aromatic rings joined to sulfur-containing aliphatic radicals, to a method for preparing these products from poly(halohydrocarbyl) poly(hydrocarbyl) benzenes, and to the use of the novel sulfur-containing products, particularly in the formation of resins, fibers and filaments.

Specifically, the invention provides new and particularly useful sulfur-containing products possessing at least one benzene ring which is substituted on from 3 to 4 of the ring carbon atoms with separate hydrocarbon radicals and is substituted on at least two of the remaining ring carbon atoms with separate aliphatic radicals each of which contains in the main chain a member of the group consisting of —(S)$_x$— (wherein $x$ is an integer and preferably 1 to 4), —SO— and —SO$_2$—. As a special embodiment, the invention provides sulfur-containing products of the formula

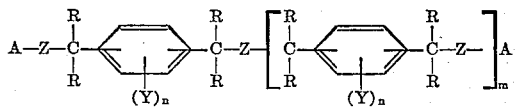

wherein Y is a monovalent hydrocarbon radical, Z is —(S)$_x$— (wherein $x$ is 1 to 4), —SO— or —SO$_2$—, R is hydrogen or a hydrocarbon radical, A is hydrogen or an alkali metal, $n$ is 3 to 4 and $m$ is an integer from 0 to 50.

The invention further provides a new method for preparing the above-described, thio- or polythio-containing products which comprises heating and reacting a poly(halohydrocarbyl) poly(hydrocarbyl) benzene with appropriate amounts of an alkaline sulfide of the group consisting of alkali metal sulfides, alkali metal hydrosulfides and alkali metal polysulfides. The above-described sulfinyl and sulfonyl-containing products are obtained by treating the corresponding thio-containing product with an oxidizing agent.

It is an object of the invention to provide a new class of sulfur-containing products. It is a further object to provide new products containing a polyhydrocarbyl-substituted aromatic ring joined to sulfur-containing aliphatic bivalent radicals, and a method for their preparation. It is a further object to provide new sulfur-containing resinous products having fiber forming properties. It is a further object to provide high molecular weight sulfur containing products which can be melt spun into fibers having good strength and solvent resistance. It is a further object to provide sulfur-containing resinous products which are useful in the preparation of improved surface coating compositions. It is a further object to provide new sulfur-containing resinous products which are useful in the preparation of plastics. It is a further object to provide new monomeric sulfur-containing products which are particularly useful and valuable in the preparation of resins and polymers having improved durability. Other objects and advantages of the invention will be apparent from the following detailed description thereof.

It has now been discovered that these and other objects may be accomplished in part by the novel sulfur-containing products of the present invention comprising products possessing at least one benzene ring which is substituted on from 3 to 4 of the ring carbon atoms with separate hydrocarbon radicals and is substituted on at least two of the remaining ring carbon atoms with separate aliphatic radicals each of which contain in the main chain a member of the group consisting of —(S)$_x$— (wherein $x$ is an integer and preferably 1 to 4), —SO— and —SO$_2$—. The new products include those having a plurality of such substituted benzene rings separated by sulfur-containing radicals which are polymeric and resinous, as well as those products having a single substituted benzene ring joined to two of the sulfur-containing radicals which are monomeric.

The polymeric products, due to their unique structural features, such as having the reoccurring benzene rings with substantially and preferably all of their ring carbon atoms, attached to the side chains have been found to have many unobvious and valuable properties. It has been found, for example, that such polymeric products having relatively high molecular weights and preferably having the sulfur-containing radicals attached to the 1 and 4 positions of the benzene ring have higher softening points and lower solubility. The presence of the substantially completely substituted aromatic rings gives the products improved durability and resistance to deteriorating reactions which involve the hydrogen atoms on the aromatic rings.

It has also been found that the polymeric products both high and low molecular weights, are of great value in the preparation of improved surface coating compositions. The new polymers may be formed into coatings by melting or by dissolving in suitable solvents, and this mixture spread out on the desired surface. The resulting coatings when prepared in particular from bis(chloromethyl) durene or isodurene are hard and durable.

The monomeric compounds have also been found to possess unusual and valuable properties due to their unique structural features, such as that of having the two or more active mercapto or alkaline metal groups and the substantially completely saturated aromatic ring. These materials may be used, for example, in the preparation of polymeric materials with polyepoxides, other bis(chlorohydrocarbyl) benzenes, or with polycarboxylic acid chlorides, which polymers possess many of the above-noted properties as to formation of fibers and coatings having improved durability and resistance to solvents. The monomeric compounds having the mercapto groups are in effect aliphatic mercaptans and can be used in other reactions where aliphatic mercaptans can be used, and in such cases, contribute the durability and high melting point feature of the substantially completely substituted aromatic ring.

The novel sulfur-containing products of the present invention wherein the sulfur is in the form of thio or polythio linkages are prepared by heating and reacting poly(halohydrocarbyl) poly(hydrocarbyl)benzenes with appropriate amounts of an alkaline sulfide of the group consisting of alkali metal sulfide, alkali metal hydrosulfides and alkali metal polysulfides. The sulfinyl and sulfonyl-containing products are obtained by treating the corresponding thio-containing products with an oxidizing agent.

The poly(halohydrocarbyl)poly(hydrocarbyl)benzenes that may be used in the process of the invention may be exemplified by the following: 1,4-bis(chloromethyl) tetramethylbenzene, 1,3 - bis(chloromethyl) - tetramethylbenzene, 1,4-bis(1-chloroethyl) tetraethyl benzene, 1,3-bis-(chloromethyl)trimethylbenzene, 1,3-bis(1-bromoethyl)-tetrabutylbenzene, 1,4 - bis(chloromethyl)2-ethyl, 3,5,6-trimethyl benzene, 1,2-bis(1-chlorobutyl) tetraoctylbenzene, 1,4-bis(1-chloropentyl)tetramethyl benzene, 1,3-bis-(chloromethyl) tetradecylbenzene, 1,4-bis(chloromethyl) dibutyl dioctylbenzene, 1,3-bis(1-chloropentyl) dichlorohexyl didecylbenzene, and 1,4-bis(chloromethyl) dihexenyl dioctyl benzene.

Preferred poly(halohydrocarbyl)poly(hydrocarbyl)-benzenes to be employed in the process include those compounds having a benzene ring substituted, in the 1,4 positions, with two chloro-substituted aliphatic hydrocarbon radicals which have the chlorine atom on the alpha carbon atom and preferably contain no more than 6 carbon atoms, and the remaining ring carbon atoms substituted with four separate hydrocarbon radicals which are preferably alkyl, cycloalkyl, alkcycloalkyl and alkenyl radicals containing no more than 10 carbon atoms. Particularly preferred are the bis(chloromethyl) tetraalkylbenzenes.

The poly(halohydorcarbyl)poly(hydrocarbyl)benzenes may be obtained by halogenating a poly(hydrocarbyl)-benzene by conventional methods. Bis(chloromethyl) tetramethylbenzene is prepared, for example, by chlorinating hexamethylbenzene. The preferred bis(chloromethyl) hydrocarbyl benzenes are preferably obtained by reacting the poly(hydrocarbyl)benzenes having at least two ring carbon atoms unsubstituted, such as tetramethylbenzene (durene), with formaldehyde and hydrogen chloride. The poly(hydrocarbyl)benzenes may be obtained by alkylating benzene with the desired hydrocarbon in the presence of an aklylating agent, such as hydrogen fluoride, as described in U.S. Patent 2,275,312.

The material to be reacted with the above-described aromatic dervatives comprises the alkali metal sulfides, such as sodium sulfide and potassium sulfide, the alkali metal hydrosulfides, such as sodium hydrosulfide and potassium hydrosulfides, and the alkali metal polysulfides such as sodium and potassium tetra- and pentasulfides. The sodium derivatives are preferred.

The proportions in which the substituted benzene and the alkaline sulfides are combined may vary over a wide range depending upon the type of product desired. The polymeric products are obtained by combining the reactants in approximately chemical equivalent amounts. The expression "chemical equivalent amounts" as used herein in relation to the amount of substituted benzene and the alkaline sulfides refers to that amount of the substituted benzene needed to furnish one halohydrocarbyl group for every alkali metal and sulfur-attached hydrogen. Preferably, such high molecular weight products are obtained by combining the materials in a chemical equivalent ratio varying from about 1.2:1 to 1:1.2, but preferably at 1:1.

The monomeric products terminated with the mercapto groups or alkali metals are obtained by employing the alkaline hydrosulfides in excess and preferably in the presence of $H_2S$. The proportions preferably vary from 1.8 to 5 times the chemical equivalent amount. If lower molecular weight products terminated with the halohydrocarbyl radicals are desired, one should employ the substituted benzenes in excess and preferably in amounts varying from 1.8 to 5 times the chemical equivalent amount.

The reaction is accomplished in the presence of a solvent or diluent. Preferred solvents are those that dissolve the substituted benzene and have some solubility for the alkaline metal salts. Mixture of dioxane and water, tertiary alcohols and water, have been found to be particularly suitable.

The temperature used to effect the reaction may also vary over a considerable range. In general, temperatures employed in the process will vary from about 50° C. to about 250° C. If one or more of the reactants are solids or semi-solids, the higher reaction temperatures, such as 125° C. to 225° C. may be needed to melt the solid reactants. Preferred temperatures generally range from about 100° C. to 250° C. Pressures employed may be atmospheric, subatmospheric or superatmospheric as desired or necessary.

The products produced by the above process may be recovered by any conventional method. They are preferably recovered by filtration or as bottoms product by stripping off the solvent and any excess reactants or by precipitation in a non-solvent.

The sulfinyl and/or sulfonyl-containing resinous products of the present invention are obtained by oxidizing the above-described thio-containing products. Complete oxidation of the thio groups produces the sulfonyl-containing resinous products, while partial controlled oxidation produces the corresponding sulfinyl substituted products.

The oxidation of the thio group may be effected by any of a large number of oxidizing agents, such as hydrogen peroxide, sodium perbenzoate and perbenzoic acid. The amount of the oxidizing agent to be employed will vary over a considerable range. If the sulfinyl-containing product is desired, it is generally desirable to react the thio-containing resinous product with an approximate chemical equivalent amount of the oxidizing agent. As herein, in relation to the oxidation of thio groups to sulfinyl or sulfonyl groups, the expression, "chemical equivalent amount" refers to the amount of agent necessary to furnish one atom of oxygen for every thio group to be oxidized. Preferably, the thio-containing resinous product and the oxidizing agent are reacted in chemical equivalent ratios of 1:1 to 1:1.5, respectively. If the sulfonyl-containing resinous product is desired, the thio-containing resinous product is treated with at least twice the chemical equivalent amount of the oxidizing agent. Preferably, the thio-containing product and agent are reacted in chemical equivalent ratios varying from 1:2 to 1:3, respectively.

The oxidation may be accomplished in the presence or absence of solvents or diluents. Examples of suitable diluents are glacial acetic acid, propionic acid, chloroform, and the like.

The temperature employed during the oxidation may vary over a considerable range depending upon the type of reactants and oxidizing agents employed. It is generally desirable to maintain the temperature between 50° C. and 150° C., preferably between 60° C. and 100° C. Cooling may be employed if necessary. Atmospheric, superatmospheric or subatmospheric pressures may be employed as desired.

The sulfinyl and/or sulfonyl-containing resinous products may be recovered by the bottoms product on stripping off the solvent and any decomposition products of the oxidizing agent.

The polymeric sulfur-containing products produced by the above process will contain reoccurring units having the structure

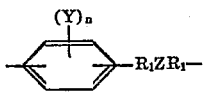

wherein Y is a hydrocarbon radical, $n$ is 3 to 4, $R_1$ is a bivalent aliphatic radical, and preferably a bivalent aliphatic hydrocarbon radical, and Z is a $—(S)_x—$ (wherein $x$ is 1 to 4), $—SO—$ or $—SO_2—$ group. The Y in the above-described formula may be an aliphatic, cycloaliphatic or aromatic radical, such as, for example, methyl, ethyl, butyl, hexyl, octyl, isopropyl, isobutyl, isooctyl, decyl, dodecyl, hexadecyl, octadecyl, allyl, 3-octenyl, 4-hexenyl, cyclohexyl, cyclopentyl, cyclopentenyl, phenyl, methylphenyl, isopropylphenyl, and the like. Y is preferably an aliphatic hydrocarbon radical, and particularly an alkyl or cycloalkyl radical containing no more 14 carbon atoms, and preferably not more than two of the Y's contain over 8 carbon atoms.

The $R_1$ radicals of the above-described unit may be any bivalent aliphatic radical, but is preferably a bivalent aliphatic hydrocarbon radical, such as an alkylene radical having the two valence bonds on the alpha carbon atom, such as methylene, 1,1-propylene, 1,1-isobutylene, 1,1-hexylene, 1,1-octylene and the like. Preferably the $R_1$ radicals contain no more than 6 carbon atoms.

Especially preferred polymeric products are those of the formula

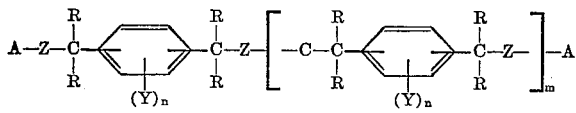

wherein Y is a monovalent hydrocarbon radical, and preferably an alkyl radical containing not more than 8 carbon atoms, Z is —$(S)_x$— (wherein $x$ is 1 to 4), —SO—, or —$SO_2$—, R is hydrogen or a hydrocarbon radical and preferably an alkyl radical containing not more than 8 carbon atoms, A is hydrogen or an alkali metal, $n$ is 3 to 4 and $m$ is an integer from 3 to 50, and more preferably from 4 to 45.

The preferred monomeric sulfur-containing products are those of the formula

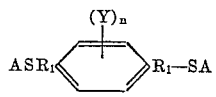

wherein Y is a hydrocarbon radical as described above, $n$ is 3 to 4, $R_1$ is a bivalent aliphatic radical, and preferably a bivalent aliphatic hydrocarbon radical such as an alkyl radical as described above, and A is hydrogen or an alkali metal.

Examples of such monomeric products include, among others, 1,4-bis(mercaptomethyl) tetramethylbenzene, 1,4-bis(mercaptomethyl) 2-ethyl-3,5,6-trimethylbenzene, 1,3-bis(mercaptomethyl) tetramethylbenzene, 1,4-bis(mercaptoethyl) tetraisopropylbenzene, 1,4-bis(mercaptomethyl) tetraoctylbenzene, 1,4-bis(1-mercaptobutyl) tetradodecylbenzene, 1,3-bis(1-mercaptoethyl) trimethylbenzene, 1,4-bis(mercaptomethyl) diethyl dibutylbenzene, 1,4-bis(mercaptomethyl) dibutyl dioctyl benzene, and 1,2-bis(mercaptomethyl) tetrabutylbenzene.

The products of the present invention are thick viscous liquids to solids depending on molecular weight. The molecular weights of the polymeric products range from a few hundred, e.g., 700, up to about 50,000. The products are insoluble or only slightly soluble in the lower alcohols and ketones and hydrocarbons, but are generally soluble in polychlorinated compounds, such as dichlorobenzene, chloroform and tetrachloroethane.

The new products having molecular weights of at least 3,000 and preferably between 10,000 and 50,000 can be spun into fibers. The spinning of these materials may be carried out by a variety of methods known to the workers in the art. For example, the resinous product may be melted and then touched with a rod to draw away a filament. The properties of the high molecular weight resins of the invention make it possible to obtain fine filaments as fine as 0.1 mm. or less.

The resinous products of the invention may be used in the preparation of coating and impregnating compositions. In these applications, they may be applied as a melt or may be dissolved in suitable solvents. Other high molecular weight resinous film-forming materials compatible therewith may also be employed in the preparation of such compositions. The resulting compositions may be painted, sprayed or otherwise applied to suitable surfaces such as metals and wood.

The resinous products may also be used in the preparation of plastic articles. For this application they are generally melted and molded while hot.

The lower molecular weight products may be further reacted with substituted benzenes as to build up the molecular weight of the product to a point where it may be used in the formation of fibers and filaments. The reactants used in this building up process may be the same or different than those used in making the original product. If the reactants are different, the finished fibers will have a block copolymer type structure. It has been found that this latter technique is very useful in preparing resinous products having many specialized properties, such as superior hardness, greater flexibility, etc., and it is generally preferred for some applications.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and properties of 1,4-bis(mercaptomethyl) tetramethylbenzene.

15 parts of sodium hydrosulfide, 80 parts of water, 300 parts of dioxane and 23.19 parts of 1,4-bis(chloromethyl) tetramethylbenzene were added to a reaction kettle equipped with stirrer, thermometer, condenser and heating mantle. The mixture was heated to reflux and maintained there for about 5.5 hours. The mixture was then cooled and filtered. The white powder that was collected was then boiled in water, filtered, and then boiled in acetic acid, filtered and dried. The resulting product was a mixture of 1,4-bis(mercaptomethyl) tetramethylbenzene

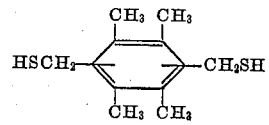

and some polymer. The pure monomer was separated from the polymer by vacuum sublimation. M.P. 154–157° C. Mercaptan sulfur 26.6% found, 28.3% calculated, M.W. 215, calc. 226.

The 1,4-bis(mercaptomethyl) tetramethylbenzene reacts readily with polyepoxides and with polycarboxylic acid chlorides to form long chain polymers.

Related products are obtained by replacing the 1,4-bis(chloromethyl) tetramethyl benzene in the above-described preparation process with equivalent amounts of each of the following: 1,4-bis(1-chloroethyl) tetramethylbenzene, 1,4-bis(chloromethyl) 3-ethyl-2,5,6-trimethylbenzene and 1,3-bis(chloromethyl) tetraethylbenzene.

*Example II*

This example illustrates the preparation of a polymeric resinous sulfur-containing product by reacting 1,4-bis(chloromethyl) tetramethylbenzene with sodium sulfide.

28.8 parts of $Na_2S$—$9H_2O$ was dissolved in 85 parts of water and this solution added to a reaction flask along with 23.1 parts of 1,4-bis(chloromethyl) tetramethylbenzene and 300 parts of dioxane. This mixture was stirred and heated at reflux for about five hours. The white powder that separated was recovered by filtration, placed in boiling water, filtered and dried and then placed in boiling methyl ethyl ketone, filtered and dried. The resulting product, which is a white powder melting at 350–355° C., and had a sulfur content of 14.3%. The product is insoluble in boiling dimethyl formamide and boiling trichlorobenzene. The powder could be fused into sheets which were very hard.

Polymers having similar properties are obtained by replacing the 1,4-bis(chloromethyl) tetramethylbenzene in the preparation process with equivalent amounts of each of the following: 1,4-bis(chloromethyl) ethyltrimethylbenzene, 1,3-bis(chloromethyl) tetrabutylbenzene and 1,3-bis(1-chloroethyl) tetrahexylbenzene.

Example III

This example illustrates the preparation of a polymeric resinous sulfur-containing product by reacting 1,4-bis-(chloromethyl) tetramethylbenzene with sodium polysulfide.

A solution prepared from 24.0 parts of $Na_2S\cdot 9H_2O$ and 9.6 parts of sulfur in 50 parts of water was added to a reaction flask containing 100 parts of dioxane. 1 part of $MgCl_2$ was dissolved in 30 parts of water and this solution added to the reaction kettle. The combined mixture was heated and stirred and then 23.1 parts of 1,4-bis(chloromethyl) tetramethylbenzene added. After 2 hours, a solution containing 4.8 parts of $Na_2S\cdot 9H_2O$ and .64 part of sulfur was added to the reaction mixture and the heating continued for one more hour. The liquid was then decanted off the polymer which had formed in the bottom. The polymer was hard and brittle at room temperature but was quite rubbery at 100° C. Sulfur—calc. 44.4%, found 44.8%.

Related polymers are obtained by replacing the 1,4-bis(chloromethyl) tetramethyl benzene in the above process with equivalent amounts of each of the following: 1,4-bis(chloromethyl) ethyl tributylbenzene and 1,3-bis(1-chloroethyl) tetramethylbenzene.

Example IV

This example illustrates the preparation and properties of 1,4-bis(mercaptomethyl) tetraisopropylbenzene.

15 parts of sodium hydrosulfide, 80 parts of water, 300 parts of dioxane and 34.6 parts of 1,4-bis(chloromethyl) tetraisopropylbenzene are added to a reaction kettle and the mixture stirred and heated to reflux for about 5 hours. The mixture is then cooled and filtered. The white powder that collected was then boiled in water, filtered and dried and then boiled in acetic acid, filtered and dried. The resulting product is identified as 1,4-bis(mercaptomethyl) tetraisopropylbenzene:

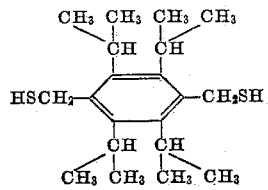

The 1,4-bis(mercaptomethyl) tetraisopropylbenzene reacts readily with polyepoxides, such as a diglycidyl ether of bis-phenol-A, and with polycarboxylic acid chlorides to form long chain polymers.

Example V

This example illustrates the preparation of a sulfur containing resinous product wherein the sulfur is in the form of sulfonyl linkages.

10 parts of the sulfur-containing resinous product prepared in Example II is added to a solution containing 500 parts of a 30% hydrogen peroxide solution and 150 parts of acetic acid and the mixture allowed to stand for one hour at room temperature. The mixture was then heated on the steam bath at 60–70° C. for 4 hours. A solution containing 100 parts of the 30% hydrogen peroxide solution and 200 parts of acetic acid is then slowly added and the mixture heated for one more hour at 60–70° C. The resinous product appears as a white solid dispersed in the acid solution. Water is added and the mixture filtered. The white precipitate is washed with water and then precipitated in methanol. The resulting product is a white high melting solid polymer possessing a plurality of $SO_2$ linkages in the main chain.

We claim as our invention:

1. A process for preparing bis(mercaptomethyl) tetramethylbenzene which comprises heating and reacting bis-(chloromethyl) tetramethylbenzene with from 5 to 10 chemical equivalent amounts of sodium hydrosulfide in the presence of hydrogen sulfide at a temperature from about 50° C. to about 250° C.

2. A process for preparing bis(mercaptoalkyl)tetraalkyl benzenes which comprises heating and reacting a bis(1-chloroalkyl) tetraalkyl benzene wherein the chloroalkyl group contains up to 6 carbon atoms and the alkyl groups attached to the 4-ring carbon atoms contains up to 8 carbon atoms each, with from 1.8 to 10 chemically equivalent amounts of an alkali metal hydrosulfide at a temperature from about 50° C. to about 250° C.

References Cited in the file of this patent

UNITED STATES PATENTS

| | | |
|---|---|---|
| 2,221,650 | Patrick | Nov. 12, 1940 |
| 2,538,941 | Macallum | Jan. 23, 1951 |